(No Model.) 4 Sheets—Sheet 1.

C. E. KESSLER.
CORN PLANTER.

No. 500,909. Patented July 4, 1893.

Witnesses
L. S. Elliott
Horace S. Beall

C. E. Kessler
Inventor
by
Attorney (No Model.)  C. E. KESSLER.  4 Sheets—Sheet 2.
CORN PLANTER.

No. 500,909.  Patented July 4, 1893.

Witnesses
L. S. Elliott.
Horace S. Beall.

C. E. Kessler.
Inventor
by
Attorney (No Model.) 4 Sheets—Sheet 3.
C. E. KESSLER.
CORN PLANTER.
No. 500,909. Patented July 4, 1893.
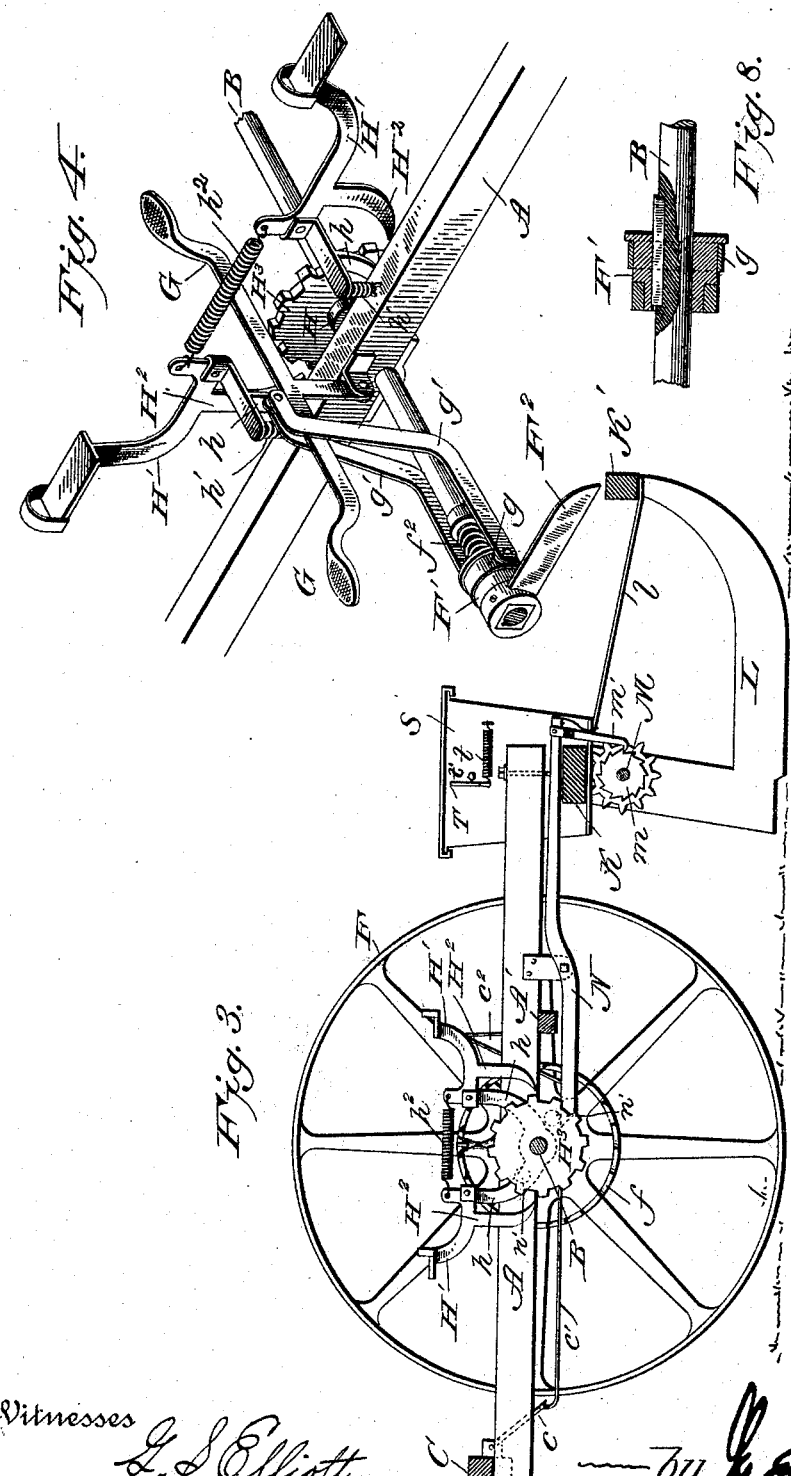

(No Model.) 4 Sheets—Sheet 4.
C. E. KESSLER.
CORN PLANTER.
No. 500,909. Patented July 4, 1893.
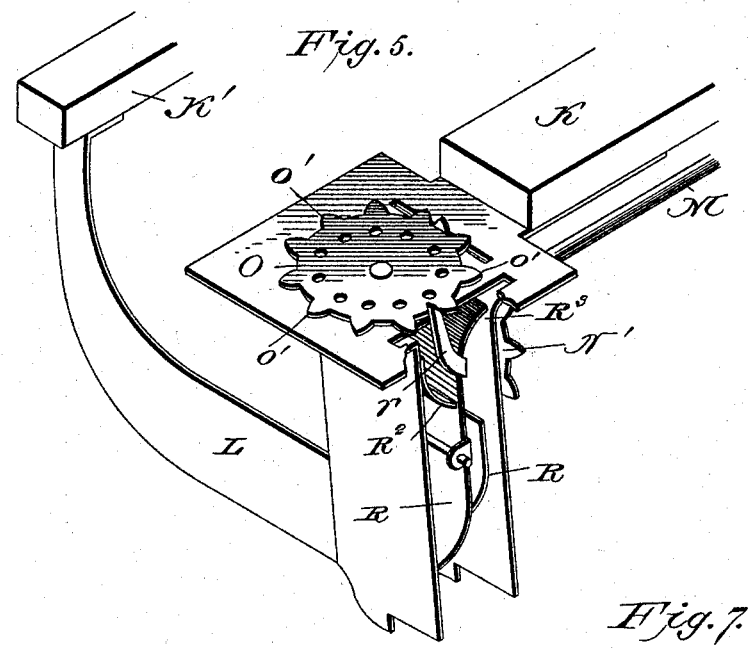
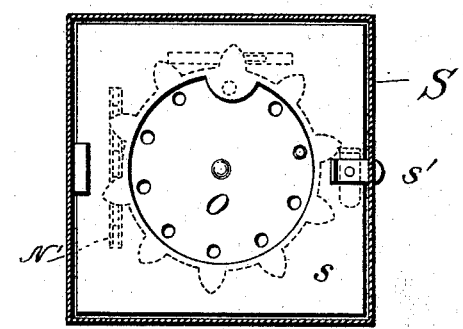
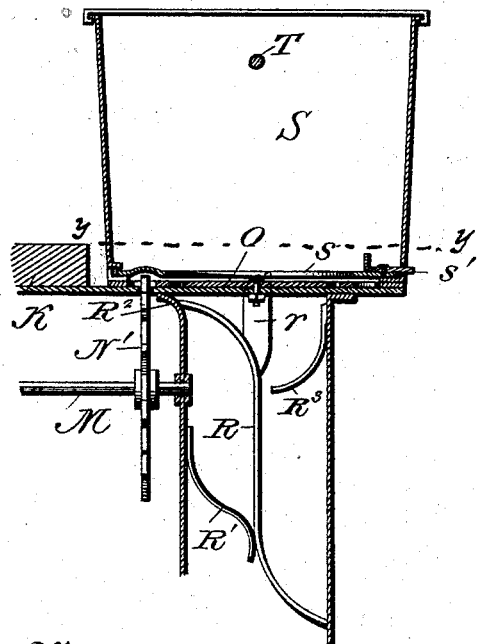
Witnesses
G. S. Elliott.
Horace S. Beall.
C. E. Kessler.
Inventor
by 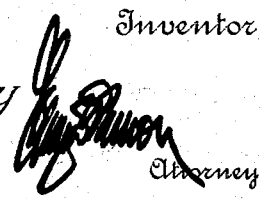
Attorney

UNITED STATES PATENT OFFICE.

CHARLES E. KESSLER, OF HUMBOLDT, KANSAS.

CORN-PLANTER.

SPECIFICATION forming part of Letters Patent No. 500,909, dated July 4, 1893.

Application filed December 1, 1892. Serial No. 453,779. (No model.)

*To all whom it may concern:*

Be it known that I, CHARLES E. KESSLER, a citizen of the United States of America, residing at Humboldt, in the county of Allen and State of Kansas, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in check-row corn planters.

The object of the invention is to provide a corn planter by means of which corn or other seeds may be dropped at regular intervals; the apparatus not only being provided with markers attached to the axle, but also with a marker carried by the frame which is adapted to be shifted from side to side, the machine having suitable mechanism for properly adjusting and manipulating the same, as will be hereinafter fully set forth.

Figure 1:
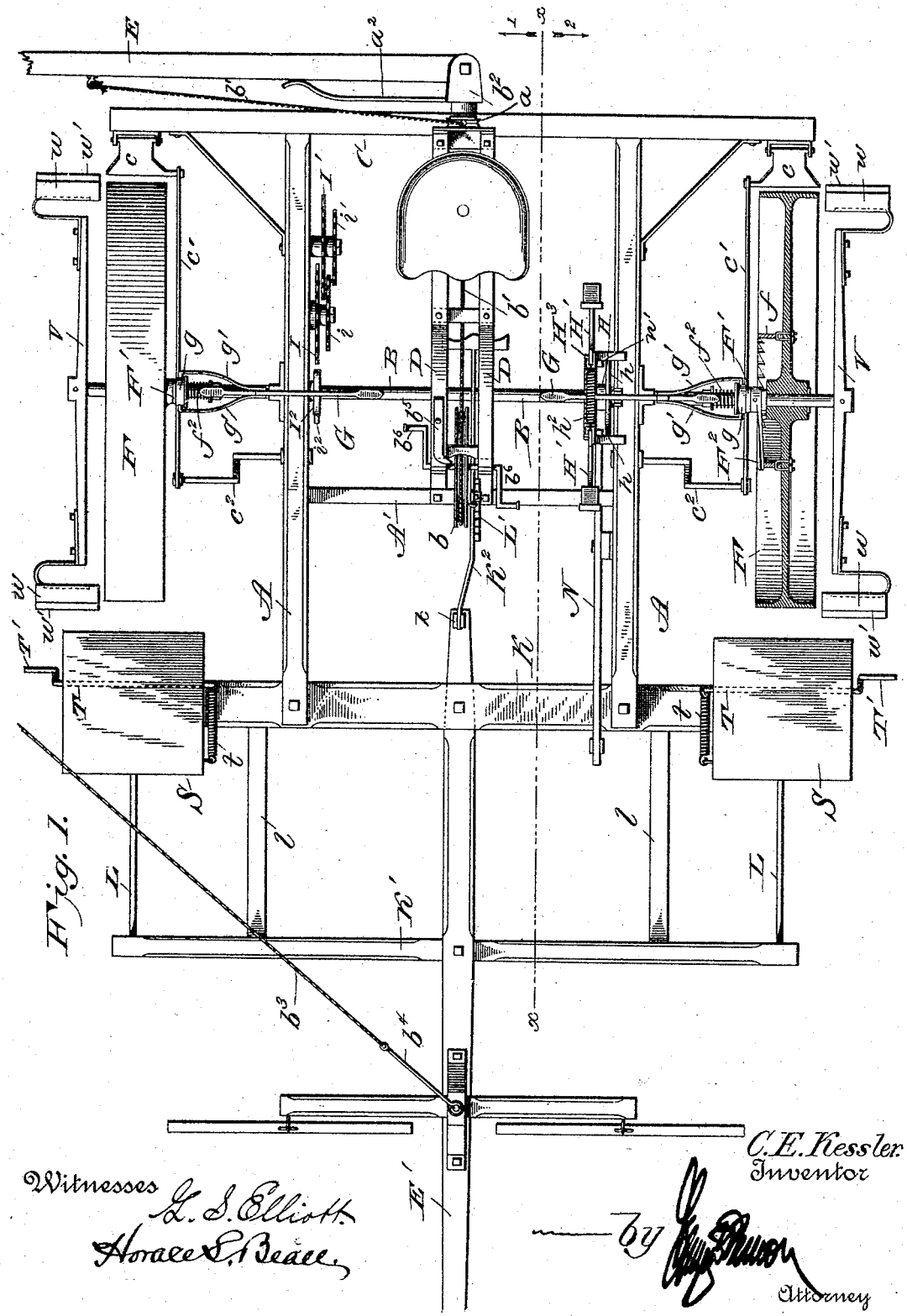
Figure 2:
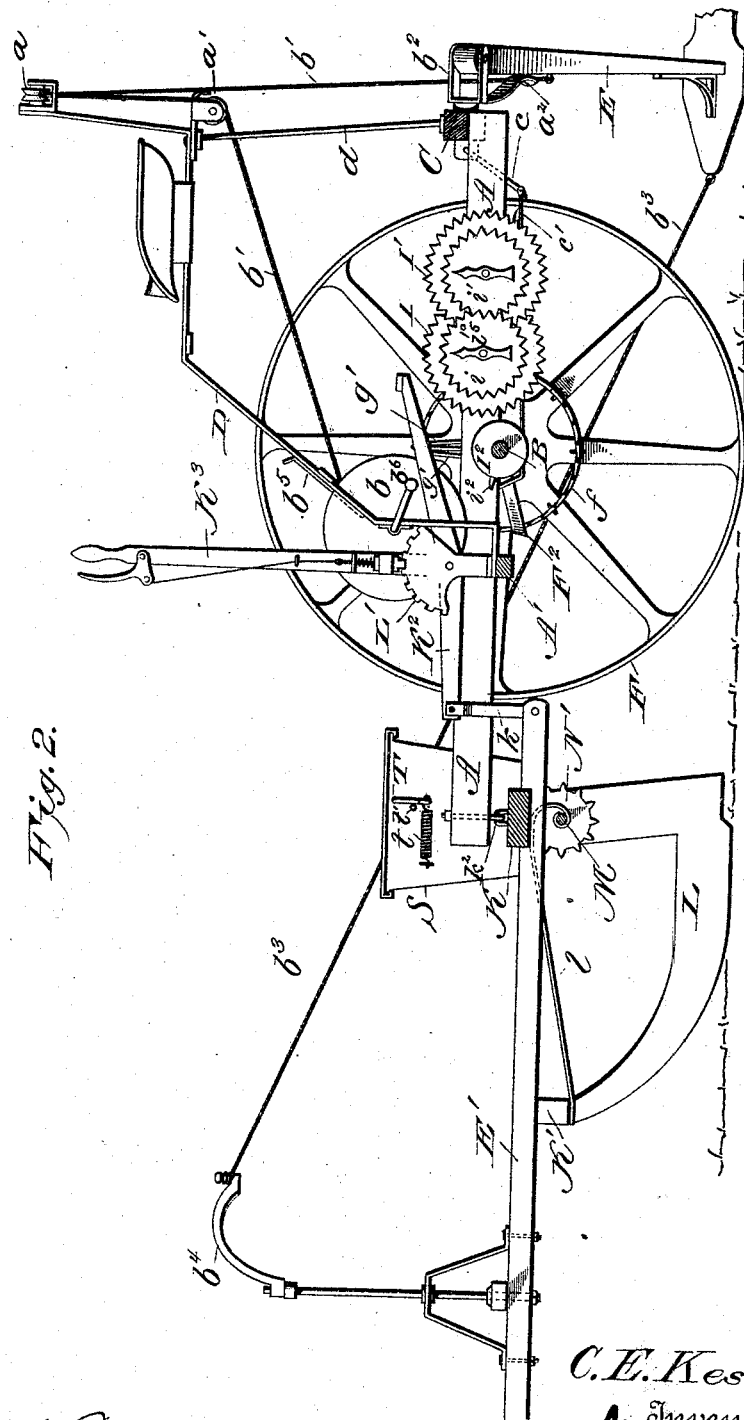

In the accompanying drawings, forming part of this specification, Figure 1 is a plan view of a planter and marker constructed in accordance with my invention. Fig. 2 is a sectional view taken on the line $x-x$ of Fig. 1, looking in the direction of the arrow No. 1. Fig. 3 is a sectional view on the line $x-x$, looking in the direction of the arrow No. 2. Fig. 4 is a detail perspective view of the mechanism for setting the marking wheels and causing the disengagement of the axle from the driving wheels. Fig. 5 is a detail view of the seed dropping mechanism, with the seed box removed. Fig. 6 is a vertical sectional view of the same; and Fig. 7 is a sectional view taken on the line $y-y$ of Fig. 6. Fig. 8 is a detail view, partly in section, showing the slide having the arm which engages with the circular ratchet-plate attached to the drive-wheel.

A A designate longitudinal beams, which are supported upon the axle B, said beams having suitable bearings which encircle the axle so that said axle may turn freely therein. To the rear ends of the longitudinal beams is connected a cross-bar C, which carries a scraper, $c$, near each end, said scrapers depending or hanging from suitable supports, and being connected by rods $c'$ to crank-arms $c^2$ pivoted to the beams near the driver's seat so that said crank-arms can be operated to throw the scrapers in contact with the periphery of the driving wheels when desired. The weight of the scrapers holds them normally out of contact with the wheels.

In front of the axle B is a cross-piece A' extending from one beam A to the other, and to the center portion of this cross-piece is attached the forward end of the seat supporting frame D, which is preferably made up of two flat bars with a space between them in which is journaled a disk $b$, the periphery of said disk being grooved to receive a flexible connection $b'$ which is led to a pulley $a$ in rear of the seat from which it extends up and over a pulley $a'$ supported by a bracket attached to the seat supporting frame to the arm E which carries a marker as shown. The arm which carries the marker is pivoted to the cross-bar C by an attachment $b^2$, said attachment also carrying a spring $a^2$ which bears upon the inner side of the arm to force the same rearward and keep the cord $b^3$ taut when said arm is shifted to move the marker from one side of the machine to the other; this spring also keeps the arm out of contact with the planter. The cord $b^3$ extends from the marker to the forward end of the machine where it is attached to a pivoted arm $b^4$ carried by a standard rigidly secured to the tongue E'. The rear end of the seat supporting frame D is braced by rods $d$ $d$, which diverge from said frame and are secured to the rear cross-bar C.

The disk $b$, hereinbefore referred to, which is journaled in the seat supporting frame has its supporting shaft provided at its ends with crank-arms $b^6$, so that said disk can be turned to shift the arm E carrying the marker by winding the cord or flexible connection $b'$ around the disk, and said disk is held against rotation by a pivoted catch $b^5$ carried by the seat supporting frame and adapted to engage with one side of the disk.

F F designate the main supporting wheels, which are loosely mounted upon the axle B, the spokes of said wheels carrying a circular ratchet plate $f$, the teeth of which project inward. The axle adjacent to the hub of each wheel is provided with a sleeve F', which is held in engagement with the axle by a feather or spline so as to be capable of a sliding movement thereon, said sleeve being normally thrown toward the hub by a spring $f^2$. These sleeves carry arms $F^2$ the ends of which are adapted to engage with the ratchet plates $f$ to cause the axle to turn with the wheels. A band $g$ encircles each sleeve $F'$ and is provided with bent arms $g'$ $g'$ the upper ends of which are attached to a foot lever G, said foot lever having a downwardly extended portion which is pivotally attached to a bracket carried by the beam A immediately above the axle. It will thus be observed that by rocking the foot lever G the supporting wheels may be allowed to turn freely on the axle; and when the foot lever is left free the spring $f^2$ will act to throw the arms $F^2$ in engagement with the ratchet plates $f$ carried by the wheels, so that there will be a positive engagement between the supporting wheels and the axle.

Adjacent to one of the beams A the axle has loosely mounted thereon a disk H, to which is attached upwardly projecting arms $h$ having cross-pieces, one end of each of which is provided with a spring $h'$ attached to the beam, and to the upwardly projecting portion of the opposite end of each cross-piece is pivoted a foot-lever $H'$, which is provided with a downwardly projecting arm $H^2$ extending inward as shown. The inner ends of the foot levers are connected to each other by a helical spring $h^2$, the tendency of which is to hold the foot levers in a horizontal position so that the arms $H^2$ will be out of contact with the serrated disk $H^3$, said disk being rigidly attached to the axle. Thus it will be observed that by manipulating either foot lever the axle can be turned to properly adjust the markers carried by the ends of the axle, the spring arms $F^2$ which engage with the ratchet plates on the supporting wheels, or the position of the rollers carried by the serrated disk $H^3$ with which engages the lever for actuating the seed slides.

To one of the beams A are pivotally secured disks I and $I'$ carrying suitable gage-wheels $i$ and $i'$ having pointers, the toothed or serrated periphery of the disk I being engaged by a spur or pin, $i^2$, carried by a disk $I^2$ rigidly attached to the axle, so that as the axle is rotated the gage-wheels will indicate the number of revolutions, and consequently the number of impressions made in the ground by the markers and the number of hills planted. The shaft of the gage-wheel I carries a pinion with which the teeth on the periphery of the disk $I'$ engage, and the disk or gage-wheel $i$ has an outwardly projecting pin $i^5$ which engages with the disk or gage-wheel $i'$ and actuates the same. The gage-wheels $i$ and $i'$ carry the pointers.

K designates a cross-beam, which is hung by means of eyebolts $K^2$ upon the forward ends of the longitudinal beams A, and in front of this cross-beam is located a bar $K'$ which is connected thereto by the runners L L and suitable brace rods $l$. The tongue $E'$ is rigidly attached to the bar $K'$ and beam K as shown. The rear end of the tongue is slotted or bifurcated for the reception of a link $k$, said link being connected at its upper end to a lever $K^2$ which is pivoted to a standard having a notched plate $L'$, and the rear end of this lever extends rearward a sufficient distance to be manipulated by the driver's foot. The lever is provided with an upwardly extending arm, $K^3$, carrying a hand actuated pawl which engages with the notched plate. By operating the foot lever and hand lever sufficient force can be exerted upon the forward frame of the planter to adjust the angle thereof to cause the runners to enter the soil to the desired depth.

M designates a shaft which is mounted in suitable hangers, preferably the downwardly extended ends of the brace-rods $ll$. This shaft carries a ratchet wheel $m$ with which a spring actuated pawl $m'$ carried by the forward end of the lever N engages, so that when said lever is actuated by the rollers $n$ on the toothed disk $H^3$ the shaft M will be rotated, and as this shaft is provided with disks $N'$ having teeth which project through slots in the bottoms of the seed boxes S S and engage the apertured disks O the apertures in said disks will be moved over the openings in the bottoms of the seed boxes which lead into the spouts in rear of the runners. The apertured disks O O are positioned horizontally in the seed boxes and the teeth $o'$ thereof, which engage with the disks $N'$, pass over the slots in the bottoms of the seed boxes so as to engage with the arms $r$ carried by the second drop or flirt valve R which is pivoted in the seed spouts and having springs to hold them against the sides of the same until thrown away by the teeth operating upon the arm. The upper ends of the side walls of the seed spouts are bent as shown at $R^2$ and $R^3$ so that the seed will always fall on the flirt valve opposite the side on which the spring $R'$ is located.

The seed boxes S are each provided with a removable bottom $a$, which is located immediately above the apertured disk O, said bottom being provided with a catch or turn-button $s'$, as shown in Figs. 6 and 7, so that when placed in position it will be securely held. This removable bottom is provided with an enlarged opening which exposes the apertures in the disk, and when said bottom is removed the disk O can be removed and another having different apertures placed upon the pivot pin.

Through the upper part of the side walls of the seed boxes extend shafts T T, each having a crank-arm at one end to which is secured a spring $t$, while the other end is bent down and out, as shown at $T'$, so as to present a point by which the driver can determine whether the seed is being dropped at the proper place, or on a line with the check mark. The spring will allow a rearward movement of said arm or pointer should the same strike an obstruction, and also holds said arm against a pin or stop $t'$ attached to the seed box to properly position the same.

V V designate cross-bars carried by the ends of the axle B, and to the ends of each are attached bent plates of spring metal which carry the markers $w$. These markers have slots or recesses in one side in which can be secured plates or blades $w'$, which are used when the soil is hard. When the soil is soft the markers $w$ are reversed and the plates $w'$ removed.

The single tree or draft mechanism is preferably pivoted on the tongue $E'$ by a continuation of the rod which supports the arm $b^4$.

Having thus described my invention, what I claim as new, and desire to secure by Letters Patent, is—

1. In a corn planter, the combination of the main supporting wheels having circular ratchet plates rigidly secured thereto, said wheels being loosely mounted on the axle, sleeves $g$ engaging with the axle and having a sliding movement thereon, arms connected to the sleeves at one end and to an oscillating foot lever G at the other, and a spring mounted on the axle for holding the arms carried by the sleeves in engagement with the ratchet plates, substantially as shown and for the purpose set forth.

2. In a corn planter, the combination of a lever G having a downwardly projecting portion pivotally attached to the frame of the planter, arms $g'$ $g'$ pivoted to the lever and to a sleeve $g$, a sliding block mounted on the axle B so as to rotate therewith, said block having an outwardly projecting arm adapted to engage with a circular ratchet plate carried by the supporting wheel, substantially as shown and for the purpose set forth.

3. In a corn planter, an axle B provided with a toothed or serrated wheel rigidly secured thereto, a frame pivoted upon the axle adjacent to said toothed or serrated wheel and provided with upwardly projecting arms $h$ having cross-pieces as shown, springs attached to the ends of said cross-pieces and to the frame of the planter, levers $H'$ pivoted to the cross-pieces and provided with foot rests and with depending pawls which engage the serrated disk or wheel, and a spring connecting the inner ends of the levers so as to hold the pawls normally out of engagement with the serrated wheel, for the purpose set forth.

4. In combination with a planter, a marker therefor pivoted to the main frame, said pivot having a forwardly extended portion and a bifurcated rear end within which the end of the arm carrying the marker lies, a pivot pin for holding the arm in engagement therewith, and a spring carried by the pivot and adapted to bear against the marking arm, a flexible connection attached to the marking arm and guided to means for tightening and loosening said flexible connection, substantially as shown, and for the purpose set forth.

5. In combination with a marking arm having a flexible connection and guided substantially as shown, of a disk $b$ having a grooved periphery to which the flexible connection is secured, a supporting shaft for said disk having bent ends and a latch $b^5$ adapted to engage with the side of said disk, substantially as shown, and for the purpose set forth.

6. In combination with the arms V, markers $w$ carried thereby, said markers having longitudinal recesses on one side and opposite thereto a concave face, said markers being detachably secured to spring plates, substantially as shown, and for the purpose set forth.

7. In combination with the markers carried by the main shaft of a planter, bars V pivoted to the seed boxes and provided with crank arms at each end, the inner crank-arms having springs $t$ attached thereto for holding the same in engagement with a stop, the outer end being located in front of the markers, substantially as shown, and for the purpose set forth.

8. In a corn planter, the combination of a disk $I^2$ carried by the axle or shaft, a pin $i^2$ attached thereto, and a register comprising vertical disks I and $I'$, pinion carried by the shaft of the disk I so as to engage with the disk $I'$, and disks $i$ and $i'$ overlapping each other, the disk $i$ having an outwardly projecting pin, substantially as shown.

9. In a planter constructed substantially as shown, a shaft M provided with a ratchet wheel $m$, means for actuating said ratchet wheel from the axle of the planter as shown, toothed disks $N'$ adapted to engage with the horizontal disks O located within the seed boxes, and a second cut-off R located within the seed spouts, said cut-off having a projecting portion which is engaged by the rotary disk O, substantially as shown, and for the purpose set forth.

10. In a planter, the combination with the seed spout having a second cut-off pivoted therein substantially as shown, said cut-off having oppositely bent ends and a projection $r$ which is engaged by the rotary disk O for moving the second cut-off in one direction, and a spring for holding said second cut-off normally closed, substantially as shown, and for the purpose set forth.

11. In a corn planter, a seed spout having the upper portion thereof bent so as to provide an inwardly projecting portion $R^2$ and an outwardly projecting portion $R^3$, a second cut-off pivoted within said seed spout and adapted to abut against the bent portion $R^3$ of said spout, the second cut-off having its ends curved in opposite directions and provided with a spring $R'$ and an arm $r$ for oscillating the second cut-off upon its pivot, substantially as set forth.

In testimony whereof I affix my signature in presence of two witnesses.

CHARLES E. KESSLER.

Witnesses:
EDWARD P. HUGHES,
WM. B. HOSTETLER.